(12) United States Patent
Yanagida et al.

(10) Patent No.: US 11,374,289 B2
(45) Date of Patent: Jun. 28, 2022

(54) BATTERY WIRING MODULE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Taiji Yanagida, Mie (JP); Hiroki Shimoda, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 143 days.

(21) Appl. No.: 16/868,049

(22) Filed: May 6, 2020

(65) Prior Publication Data

US 2020/0381692 A1    Dec. 3, 2020

(30) Foreign Application Priority Data

May 27, 2019 (JP) .............................. JP2019-098843

(51) Int. Cl.
*H01M 50/502* (2021.01)
*H01R 9/22* (2006.01)
*H01R 25/16* (2006.01)

(52) U.S. Cl.
CPC .......... *H01M 50/502* (2021.01); *H01R 9/223* (2013.01); *H01M 2220/20* (2013.01); *H01R 25/162* (2013.01)

(58) Field of Classification Search
CPC .......................... H02G 3/0437; H01M 50/502; H01M 50/528; H01R 25/162
See application file for complete search history.

(56) References Cited

U.S. PATENT DOCUMENTS

| 8,492,024 | B2 * | 7/2013 | Ogasawara | ......... H01M 50/502 429/170 |
|---|---|---|---|---|
| 9,150,115 | B2 * | 10/2015 | Ikeda | ................... H01M 10/482 |
| 9,287,672 | B2 * | 3/2016 | Nakayama | ........... H01R 25/006 |
| 2013/0171495 | A1 | 7/2013 | Ogasawara et al. | |

FOREIGN PATENT DOCUMENTS

JP        2012-164591        8/2012

* cited by examiner

*Primary Examiner* — Oscar C Jimenez
*Assistant Examiner* — Paul D Baillargeon
(74) *Attorney, Agent, or Firm* — Greenblum & Bernstein, P.L.C.

(57) ABSTRACT

A battery wiring module has a novel structure with which workability of a wire routing process can be improved and is able to prevent or reduce the occurrence of misrouting. A battery wiring module includes a plurality of busbars that electrically connect adjacent battery cells of a plurality of battery cells arranged in a row, a plurality of coated wires connected at one end to an external connection terminal and a connecting part provided at the other end being connected to one of the busbars, a wire routing body in which a busbar housing frame that houses the busbars and a wire routing passage that routes the coated wires are provided, and a sub-assembly protector that is mounted to the wire routing body, the sub-assembly protector holding a plurality of coated wires.

7 Claims, 6 Drawing Sheets

[FIG. 1]
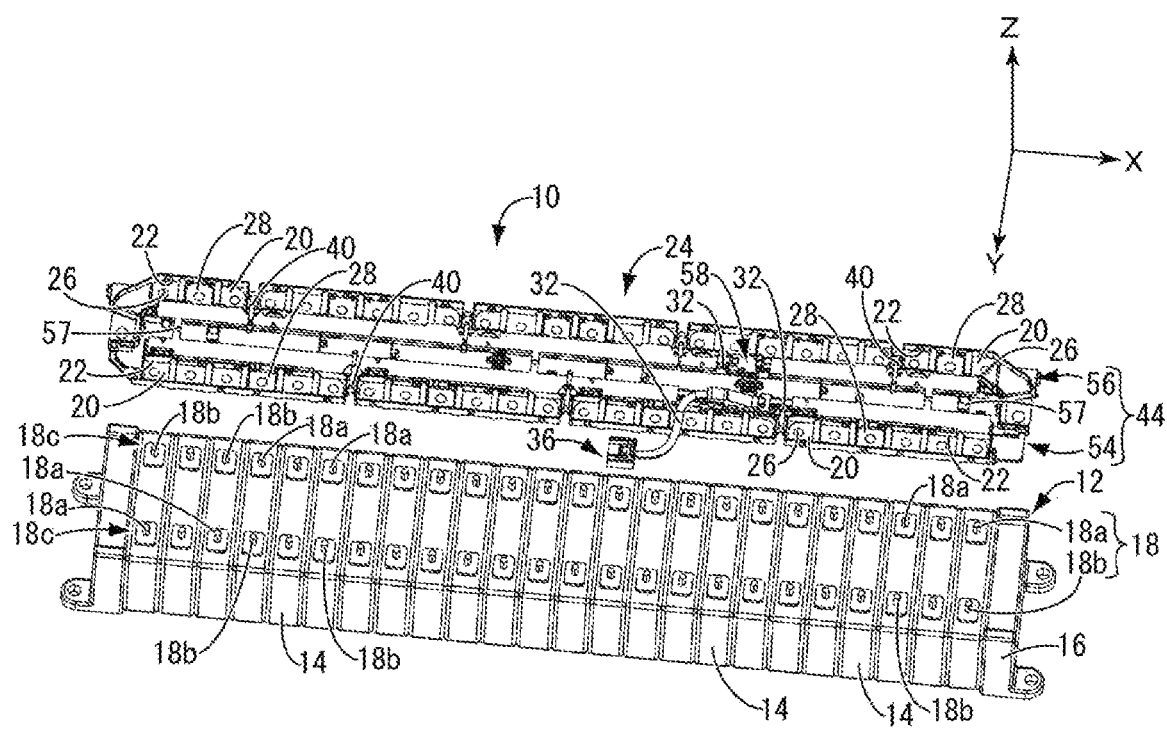

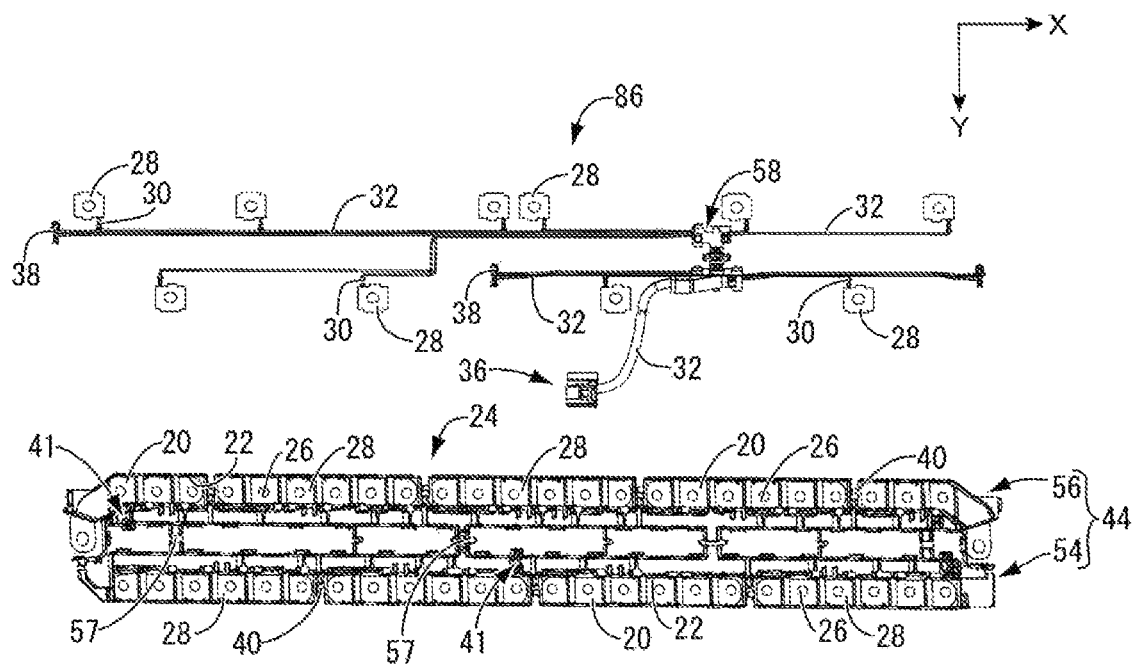
[FIG. 2]

[FIG. 3]
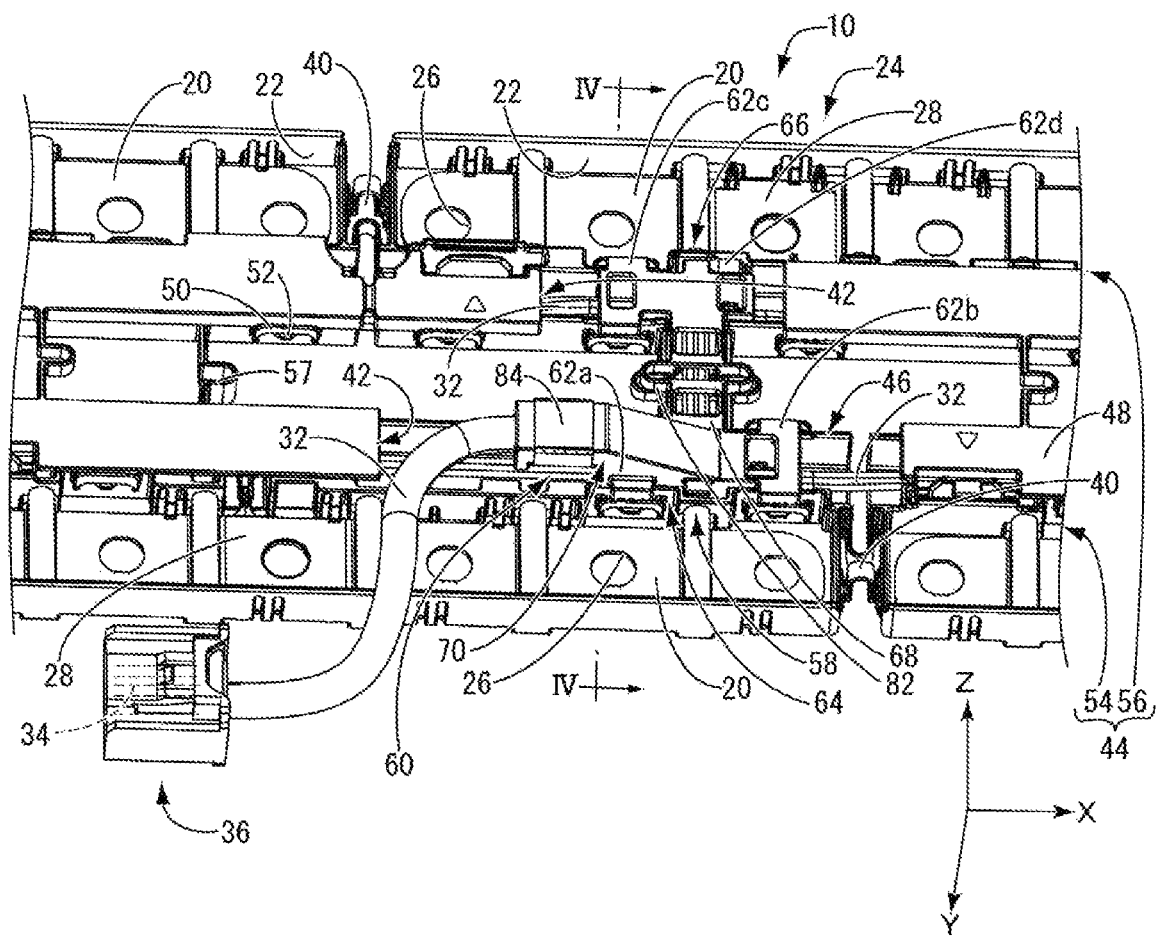

[FIG. 4]
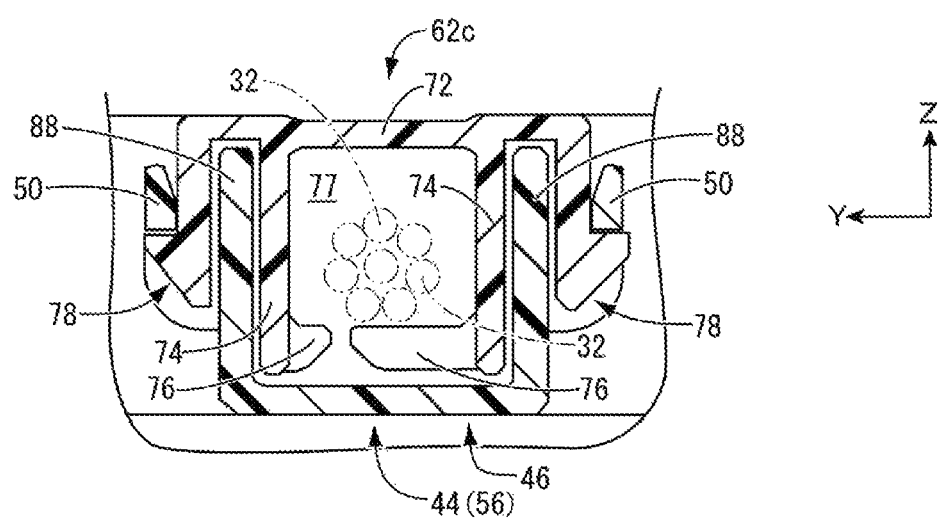

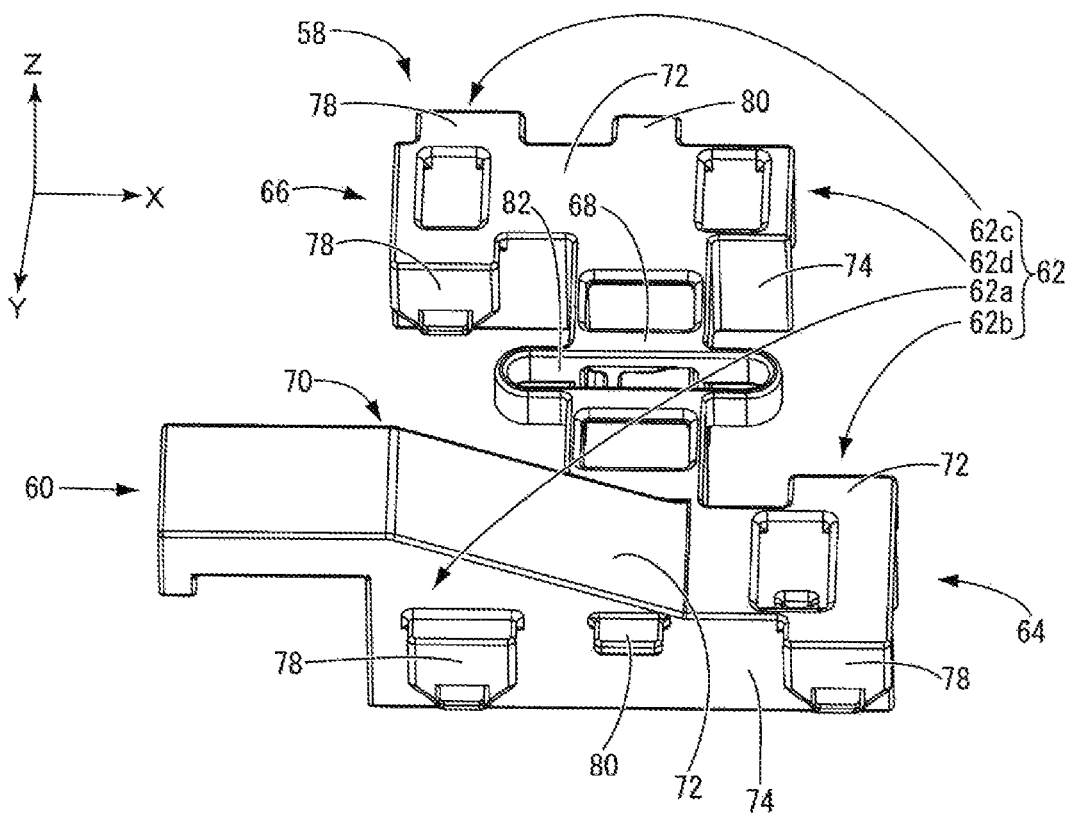
[FIG. 5]

[FIG. 6]
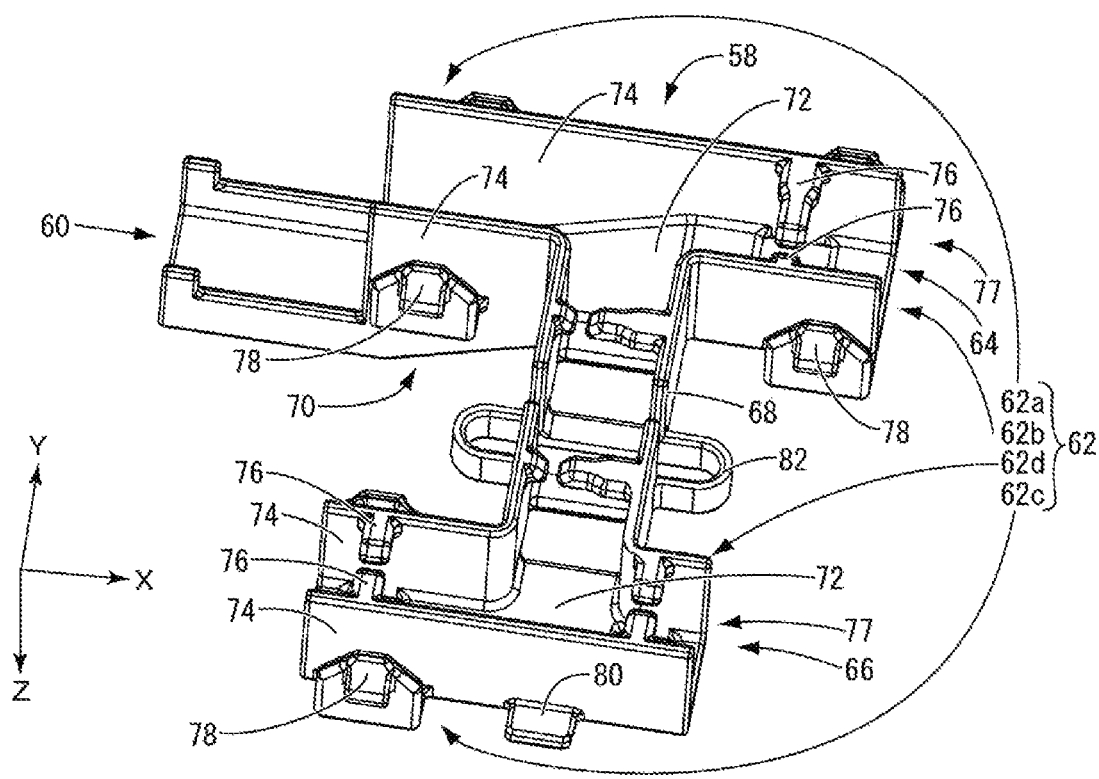

BATTERY WIRING MODULE

TECHNICAL FIELD

This disclosure relates to a battery wiring module having a plurality of electrical wires that are installed in a plurality of battery cells and a wire routing body that routes the electrical wires.

BACKGROUND ART

Electric vehicles such as electric cars and hybrid cars use a battery assembly in which a plurality of battery cells are laminated as a power source for driving the vehicle. In the battery assembly, a plurality of battery cells arranged in a row are electrically connected using a battery wiring module disclosed in JP 2012-164591A, for example. The battery wiring module includes a wire routing body in which a busbar housing frame for housing busbars that connect the electrodes of adjacent battery cells and a wire routing passage for routing coated wires connected to the busbars are provided. A large number of busbars and a large number of coated wires are thereby mounted to the wire routing body in a stable state.

JP 2012-164591A is an example of related art.

However, with the battery wiring module described in JP 2012-164591A, a connecting part provided at the other end of predetermined coated wires needs to be connected to one of the busbars housed in the busbar housing frame of the wire routing body, and the coated wire that extends from the connecting part needs to be housed in the wire routing passage. Therefore, problems such as a plurality of the coated wires becoming tangled or the wiring direction of the coated wires becoming indiscernible readily occur, leading to the possibility of deterioration in the workability of the wire routing process and incorrect routing of the wires.

In view of this, an object of this disclosure is to provide a battery wiring module having a novel structure with which workability of the wire routing process is improved and that is able to prevent or reduce the occurrence of misrouting.

SUMMARY OF THE INVENTION

A battery wiring module of this disclosure includes a plurality of busbars that electrically connect adjacent battery cells of a plurality of battery cells arranged in a row, a plurality of coated wires that are connected at one end to an external connection terminal, and a connecting part provided at the other end being connected to one of the busbars, a wire routing body in which a busbar housing frame that houses the busbars and a wire routing passage that routes the coated wires are provided, and a sub-assembly protector that is mounted to the wire routing body, the sub-assembly protector holding a plurality of the coated wires.

According to this disclosure, a battery wiring module with which workability of the wire routing process is improved and that is able to prevent or reduce the occurrence of misrouting can be provided.

BRIEF DESCRIPTION OF THE DRAWINGS

FIG. 1 is an exploded perspective view showing a battery wiring module and a battery assembly according to embodiment 1.

FIG. 2 is an exploded perspective view of the battery wiring module shown in FIG. 1.

FIG. 3 is an enlarged perspective view of a principal part of the battery wiring module shown in FIG. 1.

FIG. 4 is an enlarged cross-sectional view of the principal part taken along line IV-IV of FIG. 3.

FIG. 5 is an enlarged perspective view of a sub-assembly protector shown in FIG. 3.

FIG. 6 is a perspective view of the sub-assembly protector shown in FIG. 5 from a different direction.

EMBODIMENTS OF THE INVENTION

Description of the Embodiments of the Disclosure

Initially, modes of implementation of the disclosure will be enumerated and described.

(1) A battery wiring module of the disclosure includes a plurality of busbars that electrically connect adjacent battery cells of a plurality of battery cells arranged in a row, a plurality of coated wires that are connected at one end to an external connection terminal, and a connecting part provided at the other end being connected to one of the busbars, a wire routing body in which a busbar housing frame that houses the busbars and a wire routing passage that routes the coated wires are provided, and a sub-assembly protector that is mounted to the wire routing body, the sub-assembly protector holding a plurality of the coated wires.

The battery wiring module of the disclosure includes a sub-assembly protector that is retrofitted to a wire routing body, and this sub-assembly protector is configured to hold a plurality of coated wires. The plurality of coated wires can be held in the sub-assembly protector in advance in a routed state. Therefore, by simply mounting the sub-assembly protector in which a plurality of coated wires are arranged and held in each routing path to the wire routing body, the coated wires can be routed in a predetermined direction, and a connecting part provided at the other end of coated wires can be readily housed in a predetermined busbar housing frame. As a result, problems such as tangling the coated wires and mistaking the routing direction, which were issues with the conventional structure, do not readily occur, and improvement in the workability of the process of routing the coated wires and reduction or prevention of misrouting can be advantageously achieved.

Note that the connecting part provided at the other end of coated wires that are held in a sub-assembly protector can be any component appropriate for the required use application, such as a voltage detection terminal or a temperature measuring element. Also, from the viewpoint of component replacement and the like, the sub-assembly protector is preferably detachably mounted to the wire routing body via a lock mechanism or the like, but may be mounted in an undetachable manner. Furthermore, one sub-assembly protector may be provided for each wire routing body, or a plurality of sub-assembly protectors can also be provided for each wire routing body depending on the configuration of the battery assembly in which the wire routing body is installed.

(2) Preferably, the sub-assembly protector holds a plurality of the coated wires in each of the plurality of routing paths. Given that the sub-assembly protector can hold a plurality of coated wires in advance in each of the plurality of routing paths, the coated wires can be routed in a predetermined direction, by simply mounting the sub-assembly protector in which the plurality of coated wires are held to the wire routing body. Therefore, problems such as tangling of the coated wires and mistaking the routing direction, which were issues with the conventional structure, do not readily occur, and improvement in the workability of the process of routing the coated wires and reduction or prevention of misrouting can be achieved even more advantageously.

The plurality of routing paths of the plurality of coated wires can include, for example, paths that are connected to the external connection terminals and paths that are respectively connected on one side and the other side of the wire routing passage. In cases such as where there are a plurality of types of external connection terminals, the routing paths can include a plurality of routing paths leading to different external connection terminals.

(3) Preferably, the sub-assembly protector includes a base-end electrical wire holding part that holds the coated wires connected to the external connection terminal, and a plurality of branch wire holding parts that hold the coated wires held by the base-end electrical wire holding part so as to be divided among a plurality of the routing paths. As a result of the sub-assembly protector having the base-end electrical wire holding part that holds the coated wires connected to the external connection terminal, the length dimension of the coated wires between the external connection terminal (constituting a connector or the like) connected to an external device and the base-end electrical wire holding part can be accurately set in advance. With the conventional structure, the connecting part provided at the other end of the coated wire needs to be connected to a busbar, and the coated wires that extend from the connecting part need to be inserted through the wire routing passage and collectively pulled out of the wire pull-out opening provided in the wire routing body. Thus, the dimensions of the coated wires from the wire pull-out opening to the external connection terminal (constituting a connector, etc.) tend to be inaccurate due to tolerance stack-up. Such issues with the conventional structure are also be advantageously resolved, enabling further improvement in mounting workability as well as stability of product quality to be realized.

(4) In the above (3), preferably, at least one of the base-end electrical wire holding part and the branch wire holding part has an upper wall disposed opposing the wire routing body, a pair of side walls that protrude toward the wire routing body from the upper wall and oppose each other across a gap, and a claw part extending from a protruding end side of each side wall toward the other side wall, and an electrical wire is held by the upper wall, the side walls, and the claw parts. By pushing the coated wires toward the upper wall from between the pair of claw parts protruding from both side walls, the coated wires can be readily inserted into the region surrounded by the upper wall, the side walls and the claw parts through the outward elastic deformation of the pair of side walls held in a cantilevered manner by the upper wall, and the elastic deformation of the claw parts toward the upper wall side. The electrical wires can be stably held in the above region, as a result of the pair of side walls and the pair of claw parts elastically returning after insertion of the coated wires, and the gap between the claw parts contracting or disappearing.

(5) In the above (3) or (4), preferably, a pair of side walls of the branch wire holding part are housed between opposing surfaces of a pair of side walls constituting the wire routing passage of the wire routing body. Jamming of the coated wires can thereby be advantageously prevented.

(6) In any one of the above (3) to (5), preferably, the base-end electrical wire holding part has a regulating piece that regulates an extending direction of the coated wires. As a result of the base-end electrical wire holding part having a regulating piece, the extending direction of the plurality of coated wires that are pulled out from the base-end electrical wire holding part can be advantageously regulated, and prevention of interference with other components and space-saving routing of the coated wires can be realized. In particular, in the case where the coated wires are fixed with respect to the regulating piece, the extending direction of the coated wires and the length dimension of the coated wires between the external connection terminal constituting a connector or the like and the base-end electrical wire holding part can be stably held at a desired direction and dimension. Here, any method of fixing the coated wire to the regulating piece that uses binding tape, a binding band or the like can be employed.

(7) In any one of the above (3) to (6), preferably, the wire routing body has a first routing part that is disposed on one electrode terminal side of a plurality of the battery cells and includes the busbar housing frame and the wire routing passage, and a second routing part that is disposed on the other electrode terminal side of a plurality of the battery cells and includes the busbar housing frame and the wire routing passage, the sub-assembly protector is mounted to an intermediate portion of the wire routing body in a longitudinal direction, and a plurality of the branch wire holding parts include a first branch part that branches the coated wires on one end side of the first routing part, a second branch part that branches the coated wires on the other end side, a third branch part that branches the coated wires on one end side of the second routing part, and fourth branch part that branches the coated wire on the other end side. The sub-assembly protector includes a first to fourth (i.e., four) branch parts that branch the electrical wires respectively on one end side and the other end side of the first routing part and the second routing part of the wire routing body. The plurality of coated wires that are mounted to the wire routing body can thereby be reliably arranged and held in any conceivable routing direction. Moreover, the sub-assembly protector need only be mounted to any place of an intermediate portion of the wire routing body in the longitudinal direction. Here, the intermediate portion in the longitudinal direction refers to any portion except for both ends in the longitudinal direction. Therefore, the sub-assembly protector can be configured to be mounted to a position near the installation place of the external connection terminal to which one end of the coated wires that are pulled out from the base-end electrical wire holding part is connected, for example. The length of the coated wires that extend to the external connection terminal can thereby be shortened or the like, and the coated wires can be pulled out from any place, and improvement in design flexibility can be achieved.

(8) In the above (7), preferably, the first routing part and the second routing part of the wire routing body are coupled via a stretchably deformable first stretch part, the sub-assembly protector includes a first routing part-side place that includes the first branch part and the second branch part and a second routing part-side place that includes the third branch part and the fourth branch part, the first routing part-side place is fitted to the first routing part, the second routing part-side place is fitted to the second routing part, and the first routing part-side place and the second routing part-side place are coupled via a stretchably deformable second stretch part. In the battery assembly, given that there is dimensional tolerance between the pair of electrode terminals in respective battery cells, the first routing part of the wire routing body that is arranged on one electrode terminal side of the plurality of battery cells and the second routing part that is arranged on the other electrode terminal side are coupled via the first stretch part so as to absorb the dimensional tolerance. Furthermore, the sub-assembly protector includes the first routing part-side place including the first branch part and the second branch part and the second routing part-side place including the third branch part and the fourth branch part, and the first routing part-side place and the second routing part-side place are coupled via the stretchably deformable second elastic part. Therefore, even in the case where a configuration in which the first routing part-side place of the sub-assembly protector is mounted to the first routing part and the second routing part-side place is mounted to the second routing part is employed, the sub-assembly protector can stretchably displace to track the displacement of the first routing part and the second routing part of the wire routing body. The sub-assembly protector capable of absorbing the dimensional tolerance between the pair of electrode terminals in respective battery cells can thereby be stably held in a mounted state in the wire routing body.

(9) Preferably, the sub-assembly protector has a grip part. A worker or mounting equipment is able to grip the grip part when mounting the sub-assembly protector to the wire routing body, and the process of mounting the sub-assembly protector can be facilitated. Furthermore, the grip part can be held in a jig when mounting the coated wires to the sub-assembly protector, and facilitation of the process of mounting the coated wires can also be concurrently achieved.

Detailed Description of the Embodiments of the Disclosure

Specific examples of the battery wiring module of the disclosure will be described hereinafter with reference to the drawings. Note that the present disclosure is not limited to these illustrative examples and is defined by the claims, and all changes that come within the meaning and range of equivalency of the claims are intended to be embraced therein.

First Embodiment

Hereinafter, a summary of a battery assembly 12 will be given with reference to FIG. 1, before specifically describing a battery wiring module 10 according to embodiment 1. Note that, in the following description, the Z direction is upward, the Y direction is frontward, and the X direction is rightward. Also, reference signs may be given to only some of the plurality of members that are the same, and reference signs may be omitted for other members.

Battery Assembly 12

The battery assembly 12 is provided with a plurality of battery cells 14 arrayed in a row. Note that, in FIG. 1, the battery assembly 12 is illustrated as including 24 battery cells 14, but the number of battery cells 14 included in the battery assembly 12 is not limited thereto. In the battery assembly 12, the plurality of battery cells 14 arrayed in a row may also be arranged in a plurality of rows.

The plurality of battery cells 14 are arrayed in a given direction in the battery cell case 16. More specifically, the battery cells 14 have an electrode formation surface on which a pair consisting of a positive electrode terminal 18a and a negative electrode terminal 18b are provided to protrude. Hereinafter, the electrode formation surface may be referred to as the upper surface of the battery cells 14. The plurality of battery cells 14 are arrayed with this electrode formation surface facing up in the battery cell case 16.

Furthermore, the plurality of battery cells 14 are arrayed such that the positive electrode terminal 18a and the negative electrode terminal 18b of adjacent battery cells 14 are positioned alternately each three battery cells. Accordingly, terminal arrays 18c that are formed in the array direction of the plurality of battery cells 14 will be arranged with the positive electrode terminal 18a and the negative electrode terminal 18b alternating each three terminal arrays.

A separator (not shown) formed by resin or the like is disposed between the adjacent battery cells 14, and the plurality of battery cells 14 are, in the state of being arrayed in the battery cell case 16, arrayed with a minute gap therebetween such that the sides thereof do not contact each other. As a result of a minute gap being formed between the adjacent battery cells 14, the heat dissipation of each battery cell 14 can be minimally secured.

In order to connect the battery cells 14 in parallel and in series, the battery assembly 12 includes the battery wiring module 10. The battery wiring module 10 is attached to each terminal array 18c.

Battery Wiring Module 10

As shown in FIGS. 1 to 3, the battery wiring module 10 of embodiment 1 of the disclosure includes a plurality of busbars 20 electrically connecting each three adjacent battery cells 14, out of the plurality of battery cells 14 arranged in a row, and an insulating plate 24 having a busbar housing frame 22 that houses a plurality of busbars 20.

Bus Bar 20

The busbars 20 electrically connect the negative electrode terminals 18b of the three battery cells 14 on the far left with the positive electrode terminals 18a of the three battery cells 14 on the far right. Also, the busbars 20 electrically connect the positive electrode terminals 18a and negative electrode terminals 18b of adjacent sets of three battery cells 14 as one set. Sets of three battery cells 14 connected in parallel are thereby connected in series.

Each busbar 20 is a conductor, such as a copper plate member, for example, and has a pair of through holes 26 and 26 through which the positive electrode terminal 18a and the negative electrode terminal 18b of the battery cells 14 are respectively pass. By inserting the positive electrode terminals 18a and the negative electrode terminals 18b into the through holes and screwing a nut (not shown) thereon, the busbars 20 are respectively fixed to a positive electrode terminal 18a and/or a negative electrode terminal 18b in an electrically connectable manner.

A voltage detection terminal 28 constituting a connecting part formed with a conductor, such as a copper plate member, for example, is configured to be laid over one through hole 26 of each busbar 20. A crimping part 30 is provided in each voltage detection terminal 28, and one end of a coated wire 32 whose insulating coating has been stripped to expose the core wire is connected thereto, for example. The other end of the coated wire 32 is connected to an external connection terminal 34, and housed in a housing constituting a connector 36, and the coated wire 32 is connected to a voltage detector that is not illustrated via the connector 36. The voltage of the battery cells 14 of each set is thereby detectable. In addition, there are also coated wires 32 to which a temperature measuring element 38 is connected at one end, and the other end of the coated wires 32 is connected to the external connection terminal 34 and to a temperature detector that is not illustrated via the connector 36.

Insulating Plate 24

The insulating plate 24 is a plate member made of hard resin, and has a plurality of holes into which the positive electrode terminals 18a and the negative electrode terminals 18b of the battery assembly 12 are respectively inserted, for example. The insulating plate 24 is formed to correspond in size to the surface on which the positive electrode terminals 18a or the negative electrode terminals 18b of the battery assembly 12 are provided to protrude. The busbar housing frame 22 of the insulating plate 24 is a U-shaped groove in cross-section, and is formed with an engaging member that is not illustrated so as to be capable of fixing the busbars 20 housed in the groove and placed on the bottom surface and the voltage detection terminal 28 laid on the busbar 20. The adjacent busbar housing frame parts 22 are coupled by a reverse U-shaped coupling part 40, and the tolerance between the adjacent busbar housing frame parts 22 can be advantageously absorbed by the stretching of the coupling part 40.

Note that a temperature measuring element housing part 41 that houses the temperature measuring element 38 is formed in both ends and an intermediate part of the insulating plate 24 in the longitudinal direction.

Also, in the insulating plate 24, a wire routing passage 42 for routing the coated wire 32 is provided, as shown in FIGS. 3 and 4. A wire routing body 44 is constituted to include the busbar housing frame 22 and the wire routing passage 42. The wire routing passage 42 is formed in a tubular shape with an upward opening in a gutter-like part 46 that is U-shaped in cross-section being closed with a lid 48, for example. On the edge of the lid 48, an engaging protrusion 52 that engages and is fixed to an engaging frame body 50 provided on an outer wall of the gutter-like part 46 is provided. After housing the coated wires 32 in the gutter-like part 46 of the wire routing passage 42, the tubular wire routing passage 42 can be formed by mounting the lid 48 on the gutter-like part 46.

Wire Routing Body 44

The wire routing body 44 is disposed on one electrode terminal 18 side (frontward side) of the plurality of battery cells 14, and has a first routing part 54 that includes the busbar housing frame 22 and the wire routing passage 42. In addition, the wire routing body 44 is disposed on the other electrode terminal 18 side (rearward side) of the plurality of battery cells 14, and has a second routing part 56 that includes the busbar housing frame 22 and the wire routing passage 42. The first routing part 54 and the second routing part 56 are connected via seven stretchably deformable first stretch parts 57, as shown in FIGS. 2 and 3.

Sub-assembly Protector 58

As will be discussed later, the wire routing passage 42 includes the sub-assembly protector 58 made of a synthetic resin that is mounted to the wire routing body 44 with a plurality of coated wires 32 held in each of five routing paths. The plurality of routing paths of the plurality of coated wires 32 can include, for example, a path that is connected to the external connection terminal 34, and paths that are respectively connected on one side and the other side of the wire routing passage 42 in the longitudinal direction. That is, the sub-assembly protector 58, as shown in FIGS. 3, 5 and 6, includes a base-end electrical wire holding part 60 and a first branch part 62a, a second branch part 62b, a third branch part 62c and a fourth branch part 62d as branch wire holding parts. Note that in cases such as where the external connection terminal 34 is connected to a plurality of types of external devices, a plurality of routing paths leading to different external devices can be included.

The sub-assembly protector 58, as shown in FIGS. 3, 5 and 6, includes a first routing part-side place 64, a second routing part-side place 66, and a coupling part 68 that couples the routing part-side places 64 and 66. The sub-assembly protector 58 is mounted to a place to the right of the middle of the intermediate portion of the wire routing body 44 in the longitudinal direction, but is not limited thereto. The first routing part-side place 64 includes the first branch part 62a that branches the coated wires 32 on one end side of the first routing part 54, and the second branch part 62b that branches the coated wires 32 on the other end side. The second routing part-side place 66 includes the third branch part 62c that branches the coated wires 32 on one end side of the second routing part 56, and the fourth branch part 62d that branches the coated wires 32 on the other end side. In addition, on the first branch part 62a side of the first routing part 54, the base-end electrical wire holding part 60 that extends to the left after protruding upward obliquely to the left is provided. The extending direction of the coated wires 32 that are fixed to the regulating piece 70 that extends to the left of the base-end electrical wire holding part 60 is regulated by the regulating piece 70.

The base-end electrical wire holding part 60, the branch parts 62a, 62b, 62c and 62d, and the coupling part 68 all have an upper wall 72 that is disposed opposing the wire routing body 44 that is constituted by the insulating plate 24, and a pair of side walls 74 and 74 that protrude toward the wire routing body 44 from the upper wall 72 and oppose each other across a gap. A pair of claw parts 76 and 76 that extend toward the other side wall 74 from the protruding end side of each side wall 74 are formed on each of the pair of side walls 74 and 74 of the three branch parts 62b, 62c and 62d (excluding the first branch part 62a) and the coupling part 68. A region 77 in which the coated wires 32 are housed and held is partitioned by the upper wall 72, the pair of side walls 74 and 74, and the pair of claw parts 76 and 76. Note that, in embodiment 1, the protrusion dimensions of the pair of claw parts 76 and 76 differ from each other.

In addition, a reverse L-shaped engaging protrusion 78 is provided to protrude on the base part of the outer surface of the pair of side walls 74 and 74 of the branch parts 62a, 62b, and 62c. Also, on the upper wall 72 of the first routing part-side place 64 and the second routing part-side place 66, a rectangular plate-like grip part 80 that protrudes outwardly from a middle part in the longitudinal direction is provided. Furthermore, a U-shaped second stretch part 82 is provided in a middle part of the coupling part 68.

Mounting Process of Battery Wiring Module 10

Next, an example of the mounting process of the battery wiring module 10 will be described. The mounting process of the battery wiring module 10 is not limited to the following description.

First, the coated wires 32 to which the voltage detection terminal 28 is crimped at one end and to which the external connection terminal 34 is connected to the other end, and the coated wire 32 to which the temperature measuring element 38 is connected at one end and the external connection terminal 34 is connected at the other end are constituted in desired form using a routing jig, for example. The sub-assembly protector 58 is mounted to the plurality of coated wires 32 thus constituted into a desired. Mounting may be performed after setting the sub-assembly protector 58 upside down as shown in FIG. 6 at a predetermined position on a wiring board, for example. At this time, the sub-assembly protector 58 is positioned and held on the wiring board, as a result of the pair of grip parts 80 and 80 of the sub-assembly protector 58 being held in a jig. As a result, a plurality of coated wires 32 are mounted from above to the base-end electrical wire holding part 60 and the branch parts 62a to 62d of the sub-assembly protector 58 set upside down. At this time, in the second branch part 62b, the third branch part 62c and the fourth branch part 62d and the coupling part 68 having the region 77 in which the coated wires 32 are held, the pair of claw parts 76 and 76 elastically deform downward and the pair of side walls 74 elastically deform outwardly to allow the plurality of coated wires 32 to be inserted into the region 77 and the plurality of coated wires 32 to be housed in the region 77, upon which the pair of claw parts 76 and 76 elastically return and separation from the region 77 of the plurality of coated wires 32 is prevented. Here, the coated wires 32 respectively routed by the branch parts 62a to 62d and the coupling part 68 of the sub-assembly protector 58 are held without being fixed to the sub-assembly protector 58.

The external connection terminal 34 is then inserted into the connector 36. The coated wires 32 that are connected to the external connection terminal 34 routed by the base-end electrical wire holding part 60 are fixed to the regulating piece 70 using binding tape 84, for example, in a state where the dimensions from the base-end electrical wire holding part 60 to the connector 36 are adjusted to predetermined dimensions. Note that any method of fixing the coated wire 32 to the regulating piece 70 can be employed using a binding band or the like other than the binding tape 84.

Next, a wire harness 86 in a state of being mounted to the sub-assembly protector 58 is mounted to the wire routing body 44 in which the busbars 20 are respectively housed and fixed to the busbar housing frames 22 of the insulating plate 24. To begin with, the sub-assembly protector 58 is installed in a predetermined place of the wire routing body 44. This installation is performed by engaging the engaging protrusion 78 of the sub-assembly protector 58 in the engaging frame body 50 of the gutter-like part 46. In this state, the coated wires 32 arranged and held in each routing path are housed in the wire routing passage 42 of the wire routing body 44, by the first branch part 62a to the fourth branch part 62d. The voltage detection terminal 28 is then laid on a predetermined busbar 20 and fixed to the busbar housing frames 22, and the temperature measuring element 38 is fixed to the temperature measuring element housing part 41 of the insulating plate 24 and laid on the predetermined busbar 20. At this time, given that the coated wires 32 routed by the branch parts 62a to 62d and the coupling part 68 are not fixed to the sub-assembly protector 58, the routing process can be carried out smoothly. Thereafter, the lid 48 is fixed so as to cover the upward opening of the gutter-like part 46. This fixing is performed by engaging the engaging protrusion 52 of the lid 48 with the engaging frame body 50 of the gutter-like part 46. As a result, the sub-assembly protector 58 is mounted to the wire routing body 44 in a state where a plurality of coated wires 32 are held in each of the plurality of routing paths, thus completing the battery wiring module 10 of the disclosure. Thereby, the first routing part-side place 64 is fitted in the first routing part 54, and the second routing part-side place 66 is fitted in the second routing part 56, and the first routing part-side place 64 and the second routing part-side place 66 are coupled via the second stretch part 82. Also, the coated wires 32 held in the base-end electrical wire holding part 60 are held so as to be divided among the plurality of routing paths by the branch parts 62a, 62b, 62c and 62d. Furthermore, as shown in FIG. 4, in the branch parts 62b, 62c and 62d provided with the region 77 where the coated wires 32 are held, the pair of side walls 74 and 74 partitioning the region 77 are housed between opposing surfaces of a pair of side walls 88 and 88 constituting the wire routing passage 42 of the wire routing body 44.

Next, the operation and effect of this embodiment will be described. According to this embodiment, the sub-assembly protector 58 can be mounted to the wire routing passage 42 of the wire routing body 44 provided on the insulating plate 24, in a state where the sub-assembly protector 58 holds a plurality of coated wires 32 in advance in each routing path. Therefore, the voltage detection terminal 28 serving as the connecting part provided at one end of the plurality of coated wires 32 can be readily laid on the busbars 20 housed in a predetermined busbar housing frame 22 and fixed. As a result, problems such as tangling of the coated wires 32 and mistaking the routing direction, which were issues with the conventional structure, do not readily occur, and improvement in the workability of the process of routing the coated wires 32 and reduction or prevention of misrouting can be advantageously achieved.

As a result of the sub-assembly protector 58 having the base-end electrical wire holding part 60 that holds the coated wires 32 that are connected to the external connection terminal 34, the length dimension to which the coated wire 32 and the external connection terminal 34 constituting the connector 36 extend from the battery wiring module 10 can be accurately set in advance. In particular, in this embodiment, given that, with the branched conventional structure, the coated wires 32 need to be pulled out collectively from the wire pull-out opening provided by the battery wiring module 10, the length dimension of the coated wires 32 from the wire pull-out opening to the external connection terminal 34 that constitutes the connector 36 tends to be inaccurate due to tolerance stack-up. According to this embodiment, such issues with the conventional structure can also be advantageously resolved, and further improvements in mounting workability and stability of product quality can be realized.

Also, by simply pushing the coated wires 32 toward the upper wall 72 from between the pair of claw parts 76 and 76 that protrude from the pair of side walls 74 and 74 of the sub-assembly protector 58, the pair of claw parts 76 and 76 elastically deform on the upper wall 72 side, and the side walls 74 elastically deform outwardly, thus enabling the coated wires 32 to be readily inserted into the region 77 surrounded in the upper wall 72, the side walls 74, and the claw parts 76. After insertion of the coated wires 32, the pair of claw parts 76 and 76 elastically return, and the gap between the pair of claw parts 76 and 76 contracts or disappears, thus enabling the coated wires 32 to be stably held in the above region 77. Furthermore, given that the pair of side walls 74 and 74 partitioning the region 77 where coated wires 32 of the branch parts 62b, 62c and 62d are held between opposing surfaces of the pair of side walls 88 and 88 constituting the wire routing passage 42 of the wire routing body 44, jamming of the coated wires 32 can be advantageously prevented.

According to this embodiment, as a result of the base-end electrical wire holding part 60 having the regulating piece 70, extending direction of the plurality of coated wires 32 that are pulled out from the base-end electrical wire holding part 60 can be advantageously regulated. In particular, given that the regulating piece 70 extends approximately in parallel with the wire routing body 44, protrusion upward of the wire harness 86 can be suppressed, and prevention of interference with other members and space-saving routing of the coated wires 32, such as height reduction of the battery wiring module 10, can be realized.

The sub-assembly protector 58 includes the four (first to fourth) branch parts 62a, 62b, 62c and 62d that branch the coated wires 32 on one end side or the other end side of the first routing part 54 and the second routing part 56 of the wire routing body 44. Therefore, the plurality of coated wires 32 that are mounted to the wire routing body 44 can be reliably arranged and held in all conceivable routing directions. In particular, in this embodiment, the sub-assembly protector 58 is provided in a position slightly right of the middle of the wire routing body 44 in the longitudinal direction. The quantity of the coated wires 32 that are housed in each of the branch parts 62a to 62d can thereby be advantageously distributed or equalized. Note that the position at which the sub-assembly protector 58 is mounted to the wire routing body 44 can be freely set according to the installation position of the external device to which the coated wires 32 pulled out from the base-end electrical wire holding part 60 are connected. Therefore, similarly, in this embodiment, the sub-assembly protector 58 is attached at a position that enables the length of the coated wire 32 that extends to the external device to be shortened.

Also, the first routing part 54 and the second routing part 56 of the wire routing body 44 are coupled via the stretchably deformable first stretch part 57. The dimensional tolerance between the pair of electrode terminals 18a and 18b of each battery cell 14 in the battery assembly 12 can thereby be advantageously absorbed. Furthermore, the first routing part-side place 64 and the second routing part-side place 66 of the sub-assembly protector 58 are coupled via the stretchably deformable second stretch part 82. Therefore, even in the case where the first routing part-side place 64 of the sub-assembly protector 58 is mounted to the first routing part 54 and the second routing part-side place 66 is mounted to the second routing part 56, displacement of the first routing part 54 and the second routing part 56 of the wire routing body 44 can be tracked by the second stretch part 82.

Given that the sub-assembly protector 58 has the grip part 80, a worker or mounting equipment is able to grip the grip part 80 when mounting the sub-assembly protector 58 to the wire routing body 44, and mounting process can be facilitated. Furthermore, given that the grip part 80 can be held in a jig when mounting the coated wire 32 to the sub-assembly protector 58, facilitation of the process of mounting the coated wire 32 can also be concurrently achieved.

Variation 1

Embodiment 1 was described in detail above as a specific example of the disclosure, but the disclosure is not limited to this detailed description. Variations, improvements and the like in a range in which the object of the disclosure can be achieved are included in the disclosure. For example, variation 1 of the embodiments such as the following is also included in the technical scope of the disclosure.

(1) In the battery wiring module 10 of the disclosure, a structure in which one sub-assembly protector 58 is mounted to the wire routing body 44 was described as the battery wiring module 10, but the disclosure is not limited thereto. A configuration may be adopted in which a plurality of sub-assembly protectors 58 are mounted according to the configuration of the battery assembly 12. Also, from viewpoints of component replacement and the like, the sub-assembly protector 58 is preferably detachably mountable to the wire routing body 44 via a lock mechanism or the like, but may be mounted in a non-detachable manner. Note that the connecting part provided at one end of coated wires 32 that are held in the sub-assembly protector 58 can be any component appropriate for the required use application, such as the voltage detection terminal 28 or the temperature measuring element 38.

(2) In the battery wiring module 10 of the disclosure, the coupling part 68 had the region 77 where the coated wires 32 are held, in addition to the second branch part 62b, the third branch part 62c and the fourth branch part 62d constituting the branch wire holding part, but the disclosure is not limited thereto. According to the shape or the like on the wire routing body 44 side on which the sub-assembly protector 58 is mounted, one or more regions 77 need only be provided in any place of the sub-assembly protector 58, and the region 77 is not essential.

(3) The sub-assembly protector 58 of the disclosure has one base-end electrical wire holding part 60 and four branch parts 62a, 62b, 62c and 62d, but the number and combination of the base-end electrical wire holding part 60 and the branch wire holding parts can be freely set according to wiring structure. For example, the number of branch wire holding parts may be one.

(4) In the battery wiring module 10 of the disclosure, description was given taking a configuration in which groups of a plurality of battery cells 14 in which adjacent battery cells 14 are connected in parallel, among the plurality of battery cells 14 of the battery assembly 12, are connected in series, but the disclosure is not limited thereto. For example, given that, in the battery assembly in which all adjacent battery cells 14 are connected in series, the number of busbars 20 and the number of coated wires 32 for voltage detection or the like that are connected to the busbars 20 increase, the advantages of the sub-assembly protector can be applied even more advantageously.

What is claimed is:
1. A battery wiring module, comprising:
a plurality of busbars that electrically connect adjacent battery cells of a plurality of battery cells arranged in a row;
a plurality of coated wires that are connected at one end to an external connection terminal, and a connecting part provided at the other end being connected to one of the busbars;
a wire routing body in which a busbar housing frame that houses the busbars and a wire routing passage that routes the coated wires are provided; and
a sub-assembly protector that is mounted to the wire routing body,
wherein the sub-assembly protector holds a plurality of the coated wires in each of a plurality of routing paths, the sub-assembly protector includes:
a base-end electrical wire holding part that holds the coated wires connected to the external connection terminal,
the base-end electrical wire holding part having a regulating piece that regulates an extending direction of the coated wires, a plurality of branch wire holding parts that hold the coated wires held by the base-end electrical wire holding part so as to be divided among the plurality of routing paths, and a pair of side walls of one of the plurality of branch wire holding parts is housed between opposing surfaces of a pair of side walls constituting the wire routing passage of the wire routing body.

2. The battery wiring module according to claim 1, wherein at least one of the base-end electrical wire holding part and the plurality of branch wire holding parts has an upper wall disposed opposing the wire routing body, a pair of side walls that protrude toward the wire routing body from the upper wall and oppose each other across a gap, and claw parts extending from a protruding end side of each side wall toward the other side wall, and an electrical wire is held by the upper wall, the side walls, and the claw parts.

3. The battery wiring module according to claim 1, wherein the wire routing body has a first routing part that is disposed on one electrode terminal side of a first plurality of the battery cells and includes the busbar housing frame and the wire routing passage, and a second routing part that is disposed on another electrode terminal side of a second plurality of the battery cells and includes the busbar housing frame and the wire routing passage, the sub-assembly protector is mounted to an intermediate portion of the wire routing body in a longitudinal direction, and the plurality of branch wire holding parts include a first branch part that branches the coated wires on one end side of the first routing part, a second branch part that branches the coated wires on another end side of the first routing part, a third branch part that branches the coated wires on one end side of the second routing part, and fourth branch part that branches the coated wire on another end side of the second routing part.

4. The battery wiring module according to claim 3, wherein the first routing part and the second routing part of the wire routing body are coupled via a stretchably deformable first stretch part, the sub-assembly protector includes a first routing part-side portion that includes the first branch part and the second branch part and a second routing part-side portion that includes the third branch part and the fourth branch part, the first routing part-side portion is fitted to the first routing part, the second routing part-side portion is fitted to the second routing part, and the first routing part-side portion and the second routing part-side portion are coupled via a stretchably deformable second stretch part.

5. The battery wiring module according to claim 1, wherein the sub-assembly protector has a grip part.

6. A battery wiring module, comprising:

a plurality of busbars that electrically connect adjacent battery cells of a plurality of battery cells arranged in a row;

a plurality of coated wires that are connected at one end to an external connection terminal, and a connecting part provided at the other end being connected to one of the busbars;

a wire routing body in which a busbar housing frame that houses the busbars and a wire routing passage that routes the coated wires are provided; and a sub-assembly protector that is mounted to the wire routing body, wherein the sub-assembly protector holds a plurality of the coated wires in each of a plurality of routing paths, the sub-assembly protector includes:

a base-end electrical wire holding part that holds the coated wires connected to the external connection terminal, and a plurality of branch wire holding parts that hold the coated wires held by the base-end electrical wire holding part so as to be divided among the plurality of routing paths, and at least one of the base-end electrical wire holding part and the plurality of branch wire holding parts has an upper wall disposed opposing the wire routing body, a pair of side walls that protrude toward the wire routing body from the upper wall and oppose each other across a gap, and claw parts extending from a protruding end side of each side wall toward the other side wall, and an electrical wire is held by the upper wall, the side walls, and the claw parts.

7. A battery wiring module, comprising:

a plurality of busbars that electrically connect adjacent battery cells of a plurality of battery cells arranged in a row;

a plurality of coated wires that are connected at one end to an external connection terminal, and a connecting part provided at the other end being connected to one of the busbars;

a wire routing body in which a busbar housing frame that houses the busbars and a wire routing passage that routes the coated wires are provided;

a sub-assembly protector that is mounted to the wire routing body, wherein the sub-assembly protector holds a plurality of the coated wires in each of a plurality of routing paths, the sub-assembly protector includes:

a base-end electrical wire holding part that holds the coated wires connected to the external connection terminal, and a plurality of branch wire holding parts that hold the coated wires held by the base-end electrical wire holding part so as to be divided among the plurality of routing paths; and wherein the wire routing body has a first routing part that is disposed on one electrode terminal side of a first plurality of the battery cells and includes the busbar housing frame and the wire routing passage, and a second routing part that is disposed on another electrode terminal side of a second plurality of the battery cells and includes the busbar housing frame and the wire routing passage, the sub-assembly protector is mounted to an intermediate portion of the wire routing body in a longitudinal direction, and the plurality of branch wire holding parts include a first branch part that branches the coated wires on one end side of the first routing part, a second branch part that branches the coated wires on another end side of the first routing part, a third branch part that branches the coated wires on one end side of the second routing part, and fourth branch part that branches the coated wire on another end side of the second routing part, wherein the first routing part and the second routing part of the wire routing body are coupled via a stretchably deformable first stretch part, the sub-assembly protector includes a first routing part-side portion that includes the first branch part and the second branch part and a second routing part-side portion that includes the third branch part and the fourth branch part, the first routing part-side portion is fitted to the first routing part, the second routing part-side portion is fitted to the second routing part, and the first routing part-side portion and the second routing part-side portion are coupled via a stretchably deformable second stretch part.

* * * * *